(12) United States Patent
Creamer et al.

(10) Patent No.: US 7,284,156 B2
(45) Date of Patent: Oct. 16, 2007

(54) DEBUGGING A GRID ENVIRONMENT USING GHOST AGENTS

(75) Inventors: Thomas E. Creamer, Boca Raton, FL (US); Bill H. Hilf, La Habra, CA (US); Neil A. Katz, Parkland, FL (US); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 762 days.

(21) Appl. No.: 10/666,652

(22) Filed: Sep. 19, 2003

(65) Prior Publication Data

US 2005/0066310 A1    Mar. 24, 2005

(51) Int. Cl.
*G06F 11/00* (2006.01)
(52) U.S. Cl. .............. 714/38; 714/28; 714/33; 717/127
(58) Field of Classification Search ............ 714/25, 714/28, 31, 33, 38; 717/127
See application file for complete search history.

(56) References Cited

U.S. PATENT DOCUMENTS

| | | | |
|---|---|---|---|
| 5,592,609 A | 1/1997 | Suzuki et al. | |
| 5,935,006 A | 8/1999 | Nakajima | |
| 6,024,643 A | 2/2000 | Begis | |
| 6,122,664 A * | 9/2000 | Boukobza et al. | 709/224 |
| 6,419,577 B1 | 7/2002 | Okada et al. | |
| 6,681,243 B1 * | 1/2004 | Putzolu et al. | 709/202 |
| 6,959,432 B2 * | 10/2005 | Crocker | 714/38 |
| 6,968,540 B2 * | 11/2005 | Beck et al. | 717/127 |
| 6,981,180 B1 * | 12/2005 | Bailey et al. | 714/38 |
| 2002/0002074 A1 | 1/2002 | White et al. | |

* cited by examiner

*Primary Examiner*—Robert Beausoliel
*Assistant Examiner*—Joseph D. Manoskey
(74) *Attorney, Agent, or Firm*—Akerman Senterfitt (57) ABSTRACT

A method for debugging software objects within a grid environment including the step identifying a host, wherein the host is a software object. A ghost agent can be associated with the host. The ghost agent can replicate actions executed by the host. The host can be debugged based upon the replicated actions. The ghost agent can move from one grid within the grid environment to another grid.

32 Claims, 6 Drawing Sheets

DEBUGGING A GRID ENVIRONMENT USING GHOST AGENTS

BACKGROUND

1. Field of the Invention

This invention relates to the field of computer software and, more particularly to debugging applications in a grid environment.

2. Description of the Related Art

A grid computing environment is a distributed computing environment where computing, application, storage, and/or network resources can be shared across geographically disperse organizations. An ideal grid computing environment allows flexible, secure, coordinated resource sharing among dynamic collections of individuals, organizations, and resources. In the grid environment, a variety of computing resources that contribute to a virtual resource pool can be transparently utilized on an as-needed basis. Grid computing resources in the virtual resource pool can be treated as commodities or services, which can be consumed in a manner similar to the commercial consumption of electricity and water.

While grid computing may presently be at an early stage in its evolution, several grid computing environments have been successfully implemented. One noteworthy implementation is the NC BioGrid Project that was successfully implemented in the fall of 2001 to enable researchers and educators throughout North Carolina to pool computing resources for use in sequencing genes and related genetic research. Other notable grid implementations include SETI@home, the Drug Design and Optimization Lab (D2OL), and EUROGRID. Additionally, commercially available software products exist for establishing a customizable grid computing environment, such as Avaki's data grid from Avaki of Burlington, Me. and Grid MP Enterprise from United Devices of Austin, Tex. Further, a number of readily available toolkits and standards have been developed for creating a grid computing environment including, for example, the Globus Toolkit provided by the Globus project and the Open Grid Services Architecture (OGSA).

A grid computing environment can include multiple application domains. Each application domain can include a set of computing resources that perform a series of related tasks. Examples of application domains include, but are not limited to, word processors, database programs, Web browsers, development tools, drawing applications, image editing programs, and communication programs. The various computing resources of one application domain can be distributed across several different grids within a grid computing environment, where each grid can contain a myriad of diverse hardware components, such as communication lines, networking routers, servers, workstations, peripherals, intranets, and the like.

Conventional techniques for debugging an application domain that spans across multiple locations of a grid environment include a number of shortcomings. For example, a test version of an application domain can be installed within a non-distributed test computer designed so that the application domain can execute within a single computing space. In some instances, various aspects of the test computer can be constructed to emulate various aspects of a grid computing environment. Conventional debuggers can then be utilized to analyze the application domain. Unfortunately, the complex intermeshing of applications, users, and processes that exist within the grid environment cannot be accurately emulated within the test computer. Accordingly, the test computer abstracts away the very complications of the grid environment that make specialized debugging necessary.

Generally, off-line debugging tools are of dubious value in troubleshooting problems occurring within a production grid-environment. That is, off-line debugging tools cannot predict the side effects that the sharing of various computing resources will have upon the application domains participating in the sharing. For example, two applications, each individually stable, can be commonly deployed within a grid environment. As a result of interactions, both applications can experience problems. Alternatively, only one of the applications can operationally exhibit problems, yet the problems can result from flaws within the other, operationally functional, application. Problems and complexities increase as the number of applications sharing grid-resources increase.

One attempted solution that can function within an operational environment involves incorporating special debugging messages within the source code of application programs deployed into a grid environment. These debugging messages, however, can add significant overhead to each application program, slowing down operational performance. Moreover, including effective debugging messages within each suitable code segment of an application domain can substantially increase the development time necessary for the application domain.

Additionally, for debugging messages to have value, application domain developers have to proactively predict the types of debugging messages that are necessary to troubleshoot application domains. Such predictions can be nearly impossible for software deployed in a dynamic environment where hardware components and computing resources are constantly integrated and legacy resources modified or removed. Even if these challenges are successfully met for a particular application, other application domains within a grid environment may not be so carefully constructed, which can be problematic since inconsistencies in debugging among applications can prevent the reporting and troubleshooting of inter-application conflicts. Consequently, including specialized debugging messages within the source code of grid-based applications does not resolve the shortcomings of grid based debugging.

SUMMARY OF THE INVENTION

The present invention provides a method, a system, and an apparatus for debugging a grid environment using ghosting agents. More specifically, the present invention can associate ghosting agents to hosts, wherein a host is a software object. The ghost agent can replicate actions executed by the host. Debugging commands can be conveyed to the ghost agents. The ghost agents can responsively execute the debugging command and generate at least one debugging message. Since debugging commands are executed within ghost agents against replicated actions, the host and actions relating to the host can remain unaffected by the debugging activity. Debugging messages can be conveyed to a centralized location that gathers data from an assemblage of ghost agents.

It should be noted that ghost agents and hosts can move within a grid environment during the performance of their respective undertakings. As used herein, movement in a grid environment refers to the movement from one grid component to another component within a grid and/or movement from one grid to a different grid of the grid environment.

One aspect of the present invention includes a method for debugging software objects within a grid environment including the step identifying a host, wherein the host is a software object. A ghost agent can be associated with the host. The ghost agent can replicate actions executed by the host. The host can be debugged based upon the replicated actions. The host can move from one grid within the grid environment to another grid. The ghost agent can also move from one grid within the grid environment to another grid. The movement of the ghost agent can be in accordance with movement of the host allowing the ghost agent to automatically follow the host. The actions executed by the host can be executed within a production environment. Replicated actions can be prevented from operationally executing in the production environment.

In one embodiment, the debugging can include the steps of receiving a debugging command, executing the debugging command, and responsively generating at least one debugging message. Further, a location can be determined that is external to the ghost agent so that debugging messages can be conveyed to that location. In another embodiment, the debugging step can identify a parameter defined within the host. A value for the parameter can be determined using the ghost agent. The debugging can also include the step of determining the value for the parameter before one of the replicated actions is executed. The debugging can further include the step of determining a value for the parameter after the replicated action is executed.

A processing break point can be determined from at least one of the replicated actions. The execution of the replicated action can be halted at the processing break point. At least one parameter value for a system variable can be determined at the processing break point. The execution of at least a portion of the replicated actions can be stepped. At least one parameter value can be determined at each execution step.

In another embodiment, several hosts can be selected. Each of the hosts can be associated with a ghost agent that can replicate the actions that the host executes. Each replicated action can be debugged. The selected hosts can be utilized within a common application domain to debug the application domain. The hosts can be disposed within different grids of the grid environment. An interface can be provided for debugging the application domain. The interface can debug the hosts regardless of the grid within which the hosts are disposed.

Another aspect of the present invention can include a debugger. The debugger can include one or more hosts, wherein the hosts can be software objects for an application domain distributed within different grids of a grid environment. At least one ghost agent can be associated with a selected one of the hosts. The ghost agent can debug the associated host. The debugger can also include an interface for debugging the application domain. The interface can convey debugging commands to the ghost agents and responsively receive debugging messages. At least a portion of the hosts can move from one grid within the grid environment to another grid. The ghost agents can responsively move from grid to grid in accordance with movement of the associated host. The debugger can also include a debugging data store configured to record the debugging messages received from the ghost agents. The debugger can further include a debugging analyzer that can analyze data of the debugging data store.

Yet another aspect of the present invention can include a ghost agent. The ghost agent can include a ghost controller for managing interactions between the ghost agent and a grid environment. The ghost agent can automatically move from grid to grid within a grid environment to follow movements of a host. The ghost agent can include a means for debugging the host. The ghost agent can also include a ghost log configured to record debugging messages. Further, the ghost agent can include a means for associating the ghost agent with the host. The ghost agent can also include a ghost identifier configured to identify the ghost agent to components within the grid environment. Additionally, the ghost agent can include a means for disassociating the ghost agent from the host as well as a means for associating the ghost agent with a different host.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

The invention disclosed herein provides a method, a system, and an apparatus for performing debugging within a grid environment. The debugging involves the use of ghost agents. A ghost agent can associate itself with a host and can replicate the actions executed by the host, wherein a host is a software object. The ghost agent can further receive debugging commands and responsively generate debugging messages. The debugging messages can be based on manipulations of the replicated actions, and therefore have no operational affect upon the actions executed by the host.

As used herein, a ghost agent can be a self-managing, self-identifying software object capable of performing pre-defined tasks in a self-sufficient manner. Any suitable technique can be used to attach the ghost agent to the host including, but not limited to, debugging attachment techniques, system calibration techniques, hardware performance testing techniques, and similar binding methodologies.

Figure 1:
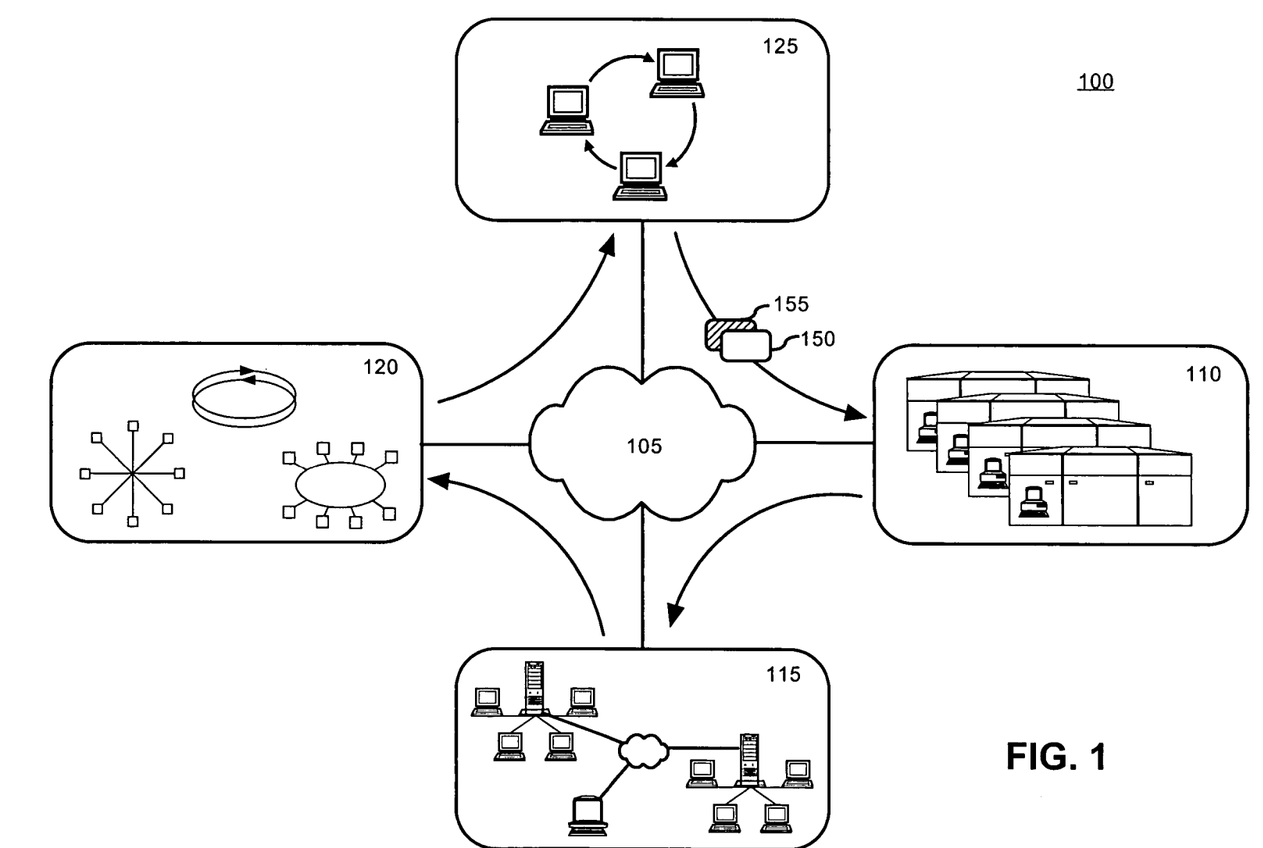
FIG. 1 is a schematic diagram illustrating an exemplary grid environment enabled for ghost agents and hosts.

FIG. 1 is a schematic diagram illustrating an exemplary grid environment 100 enabled for ghost agents and hosts. The grid environment 100 can be a distributed shared computing environment where a pool of computing resources are accessible on an as needed basis to a multitude of applications, users, and organizations. That is, within the grid computing environment 100 computing resources can be treated as commodities in a fashion similar to other consumer commodities, such as electricity and water.

As used herein, computing resources can include low-level and high-level resources as well as software and hardware resources. Low-level resources can include processing cycles of a CPU, storage space in a memory, capacity, bandwidth within a communication pathway, and other such hardware resources. Low-level resources can also include microcode routines, threads, CPU processes, and other such software resources. High-level hardware computing resources can include printers, fax machines, copiers, input devices, display devices, database storage space, removable media, and the like. High-level software resources can include algorithms and heuristics such as database search routines, spell-checking routines, transcription services, text-to-speech services, format conversions, and the like.

The grid environment 100 infrastructure can include components that utilize any hardware platform, operating system, storage scheme, and software resource. In order to be integrated within the grid environment 100, each computing component can be communicatively linked to the grid environment 100 through the network 105. Each computing component can also adhere to the standards and protocols defined within the architecture of the grid environment 100. The grid environment 100 can include one or more grids, such as grids 110, 115, 120, and 125, communicatively linked to one another through a network 105. Each grid can represent a grouping of physically differentiable hardware resources.

The grid 110 can include a multitude of mainframe or supercomputers. The grid 115 can include several local area networks, workgroups, and computing arrays. The grid 120 can include computing resources arranged according to any topography including, but not limited to, star topographies, Fiber Distributed Data Interface (FDDI) rings, token rings, and the like. The grid 125 can include one or more peer-to-peer networks. One of ordinary skill in the art can appreciate that the invention is not to be limited in this regard, that any hardware resources, topography, and software can be included in the grid environment 100, and that such arrangements are contemplated herein.

Host 150 can be a software object capable of moving within the grid environment 100. For example, the host 150 can move from grid 110 to grid 115 or from grid 120 to grid 125 to grid 115. The host 150 can also move from one location within a grid to another location. For example, the host 150 can move from one workgroup in grid 115 to a different workgroup in grid 115. Whenever the host 150 moves, the associated ghost agent 155 can move accordingly. Thus, the ghost agent 155 can perform debugging tasks for the associated host 150 in a location independent fashion.

One illustrative example of ghost agents 155 operating within a grid environment 100 can relate to a Massive Multi-Player Gaming (MMPG) system. Each player of the MMPG system can be represented by a host 150 that responds to user instructions and interacts with the gaming environment. While playing the MMPG, players can move from one game play area to another, thereby moving the host 150 within the grid environment 100. Ghost agents 155 can be attached to selected players and can move within the grid environment 100 according to the movements of the host 150. The debugging aspect of the hosts can be used to detect and remedy operational errors.

For example, if a number of players experience erratic behavior when campaigning in a suspect area of the MMPG, ghost agents 155 can be attached to players at the onset of adventures into the suspect area. System administrators can monitor the player actions and issue debugging commands to the ghost agents 155 as appropriate. Of course, the above MMPG example is just one possible application within which ghost agents 155 can be utilized and the invention is not limited in this regard.

Figure 2:
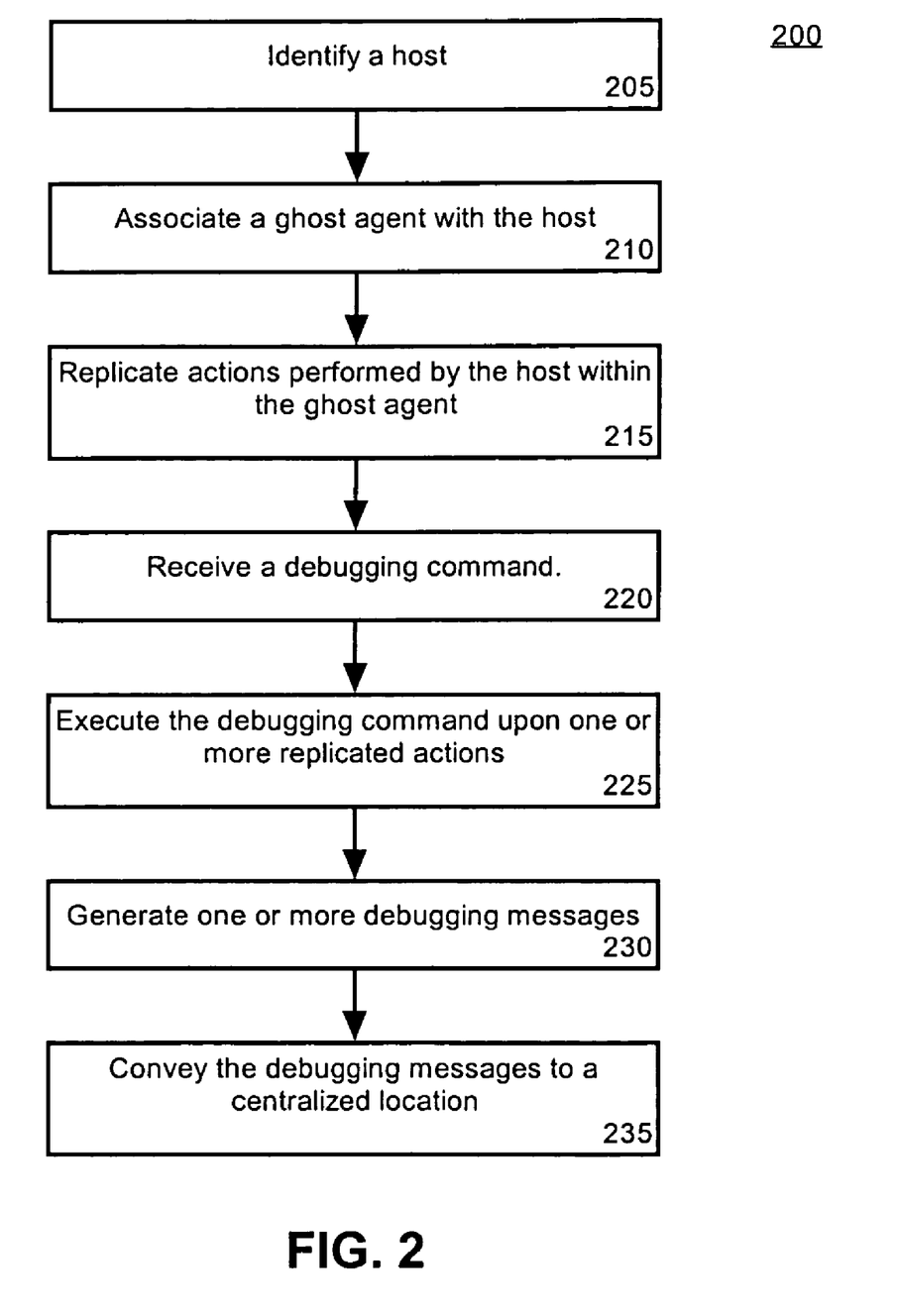
FIG. 2 is a flow chart illustrating a method for debugging using ghost agents in accordance with the inventive arrangements disclosed herein.

FIG. 2 is a flow chart illustrating a method 200 for debugging using ghost agents in accordance with the inventive arrangements disclosed herein. The method 200 can be performed in the context of a computing grid environment where a common pool of computing resources can be utilized by consumers. Additionally, the debugging of method 200 can span multiple grids and components of the grid environment. The method 200 can begin in step 205, where a host can be identified. In step 210, a ghost agent can be associated with the host. In step 215, actions executed by the host can be replicated within the ghost agent. In step 220, a debugging command can be received. In step 225, the ghost agent can execute the debugging command upon one or more replicated actions. In step 230, one or more debugging messages can be generated. In step 235, the debugging messages can be conveyed to a centralized location.

Figure 3A:
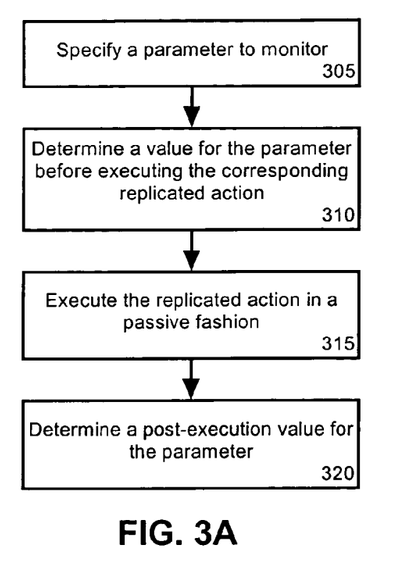
FIG. 3A is a flow chart illustrating an exemplary debug command in accordance with the inventive arrangements disclosed herein.

It should be appreciated that the method 200 is not limited to any particular set of debugging commands and that any of a variety of debugging commands can be enabled. For example, one such debugging command, illustrated in FIG. 3A, monitors a specified parameter or variable. In step 305 of FIG. 3A, a parameter can be specified, wherein the parameter is allocated a space in memory during the execution of one or more replicated actions. In step 310, a value can be determined for the parameter before the corresponding replicated action is executed. In step 315, the replicated action can be executed in a passive fashion so that the grid environment is not altered by the execution of the replicated action. That is, the ghost agent can locally execute the replicated action, preventing the replicated action from triggering operational changes within the grid environment. In step 320, a post-execution value can be determined for the parameter.

Figure 3B:
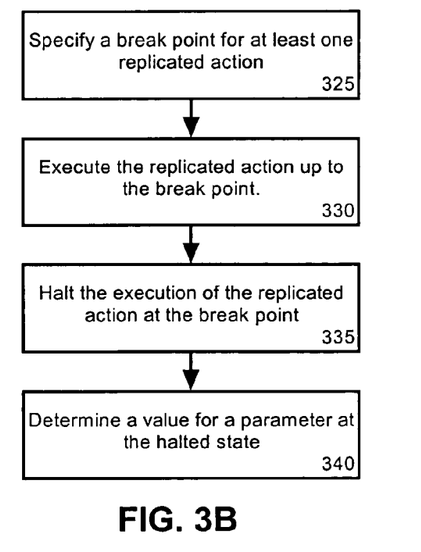
FIG. 3B is a flow chart illustrating another exemplary debug command in accordance with the inventive arrangements disclosed herein.

Another exemplary command, illustrated in FIG. 3B, can monitor system values at a specified break point placed within the replicated action. In step 325 of FIG. 3B, a break point can be specified for at least one replicated action. In step 330, the replicated action can be executed normally unit the break point is encountered. In step 335, the execution of the replicated action can be halted at the break point. In step 340, a value for at least one parameter can be determined at the halted system state.

Figure 3C:
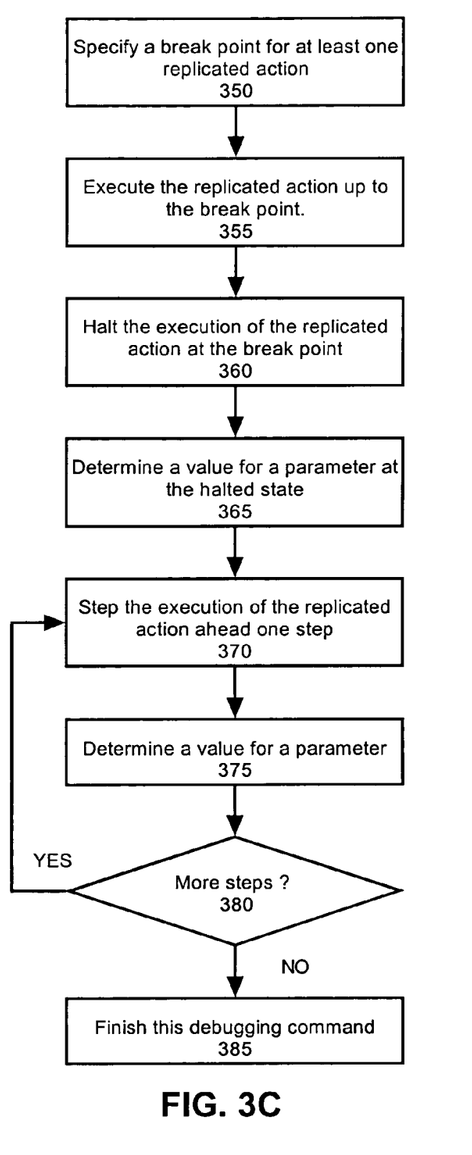
FIG. 3C is a flow chart illustrating still another exemplary debug command in accordance with the inventive arrangements disclosed herein.

Still another exemplary debugging command is illustrated in FIG. 3C. In step 350 of FIG. 3C, a break point can be specified for at least one replicated action. In step 355, the replicated action can be executed unit the break point is encountered. In step 360, the execution of the replicated action can be halted at the break point. In step 365, a value for at least one parameter can be determined at the halted system state. In step 370, the execution of the replicated action can be stepped. Any quantity can be specified as a step size. For example, the stepping can be on a line-by-line basis. Alternatively, a repeating process can be stepped ahead one or more cycles. In step 375, a value can be determined for a parameter. In step 380, if there are more steps to be performed, the method can proceed to step 370. If in step 380, however, there are no more steps to be performed, the method can proceed to step 385 where, the illustrated debugging command can finish.

Figure 4:
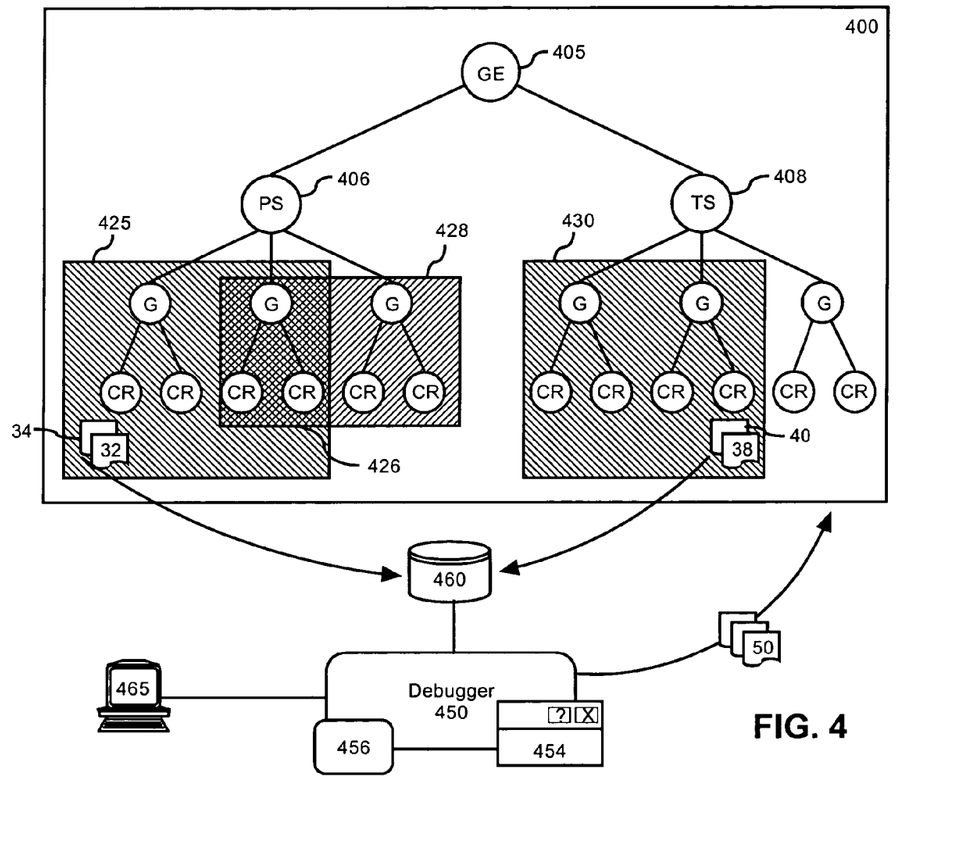
FIG. 4 is a schematic diagram illustrating a system in which a centralized debugger can debug grid-based applications in accordance with the inventive arrangements disclosed herein.

FIG. 4 is a schematic diagram illustrating a system in which a centralized debugger can debug grid-based applications in accordance with the inventive arrangements disclosed herein. The system can include a debugger 450, a testing computer 465, and a debugging data store 460. The debugger 450 can be a program configured to search for and correct errors or problems existing within other software. The debugger 450 can utilize any of the ghost-related debugging methods described herein to implement debugging features within a grid environment. The debugging features implemented by the debugger 450 are not limited to a particular subset of features, and the any debugging features commonly used in the art can be implemented using the debugger 450. Exemplary debugging programs exhibiting common debugging features include GDB by the GNU project, the Java Platform Debugger Architecture (JPDA) by Sun Microsystems, Inc. of Santa Clara, Calif., the IBM Distributed Debugger by International Business Machines (IBM) Corporation of Armonk, N.Y., and Built-in Linux Kernel Debugger (KDB) by Silicon Graphics Incorporated (SGI) of Mountain View, Calif.

The debugger 450 can debug software installed within a testing computer 465, which can be a stand-alone device not deployed within a grid environment 400. Additionally, the debugger 450 can debug software installed within the grid environment 400, which can include a test grid environment and/or a production grid environment. The debugger 450 can also include a debugging interface 454 and a debug analyzer 456.

The debugging interface 454 can allow system developers and other users to access the functionality of the debugger 450. The debug analyzer 456 can be a development tool configured to examine and analyze the debugging data store 460. For example, the debug analyzer 456 can data mine the debug data store 460, can contain problem identification routines, can manage a large quantity of heterogeneous debugging data, can alert users of trends in usage and/or system difficulties, and perform similar analysis functions.

When the debugger 450 operates with the grid environment 400, debug commands 50 can be directed toward designated ghost agents 34 and 40 disposed throughout the grid environment 400. The debug commands 50 can trigger the ghost agents 34 and 40 to execute debugging procedures upon replicated actions resulting in debugging messages. The ghost agents 34 and 40 can convey these debugging messages to the debugging data store 460. Subsequently, the debugger 450 can access and utilize the debugging messages.

In FIG. 4, the grid environment 400 enabled for the debugger 450 is illustrated as a series of nodes and applications spanning these nodes. The grid environment 400 includes a root node 405. This root node, labeled "GE" for grid environment, can include a production segment 406 and a test segment 408, represented by nodes "PS," and "TS" respectively. The production segment 406 can represent a partitioned segment of the grid environment 400 reserved for operational purposes. The test segment 408, on the other hand, can represent a partitioned segment of the grid environment 400 reserved for testing purposes. Debugging commands 50 can be performed in both the production segment 406 and the test segment 408.

The production segment 406 and the test segment 408 can each include one or more different grids, each grid represented by a node labeled "G." Each grid can further provide one or more computing resources, represented by nodes labeled "CR." The computing resources can be pooled into the resource pool of the grid environment 400 and be utilized by various grid users on demand.

Application domains 425, 428, and 430 can exist within the grid environment 400, each functioning as a "virtual application" disposed within the grid environment 400. Unlike traditional applications that generally reside on a single server, application domains 425, 428, and 430 can physically span across several grids and grid components, yet logically function as a single application having a single user interface. Each application domain can utilize several different computing resources. Additionally, a set of computing resources can be utilized by more than one application domain. For example, application domain 425 and application domain 428 share a portion of computing resources labeled shared segment 426. Exemplary types of application domains 425, 428, and 430 can include productivity applications, entertainment applications, development applications, office applications, utility applications, multimedia applications, data management applications, graphic design applications, and the like.

Application domains 425 and 430 can utilize hosts 32 and 38 respectively while performing application-specific transactions. Ghost agent 34 can perform debugging functions relating to its associated host 32. Ghost agent 40 can perform debugging functions relating to its associated host 38.

One of ordinary skill in the art should appreciate that the segmentation of the grid environment 400 need not occur within every embodiment of the present invention and that both operational behavior and test behavior can occur within a non-delineated grid environment 400. Further, when the grid environment is segmented, the segmentation of the grid environment 400 into the production segment 406 and the test segment 408 can occur in any of a variety of ways that include static and dynamic segmentation methods.

If segmented statically, a fixed portion of grid resources can be established for each segment. If segmented dynamically, the portion of grid resources established for each segment can vary over time and/or with system load. For example, during periods of increased grid activity, such as during a workday, a high resource percentage can be allocated for the production segment 406. This high resource percentage can be lowered during periods of lesser operational activity, thereby allowing a greater portion of resources to be dedicated towards the testing segment 408.

Figure 5:
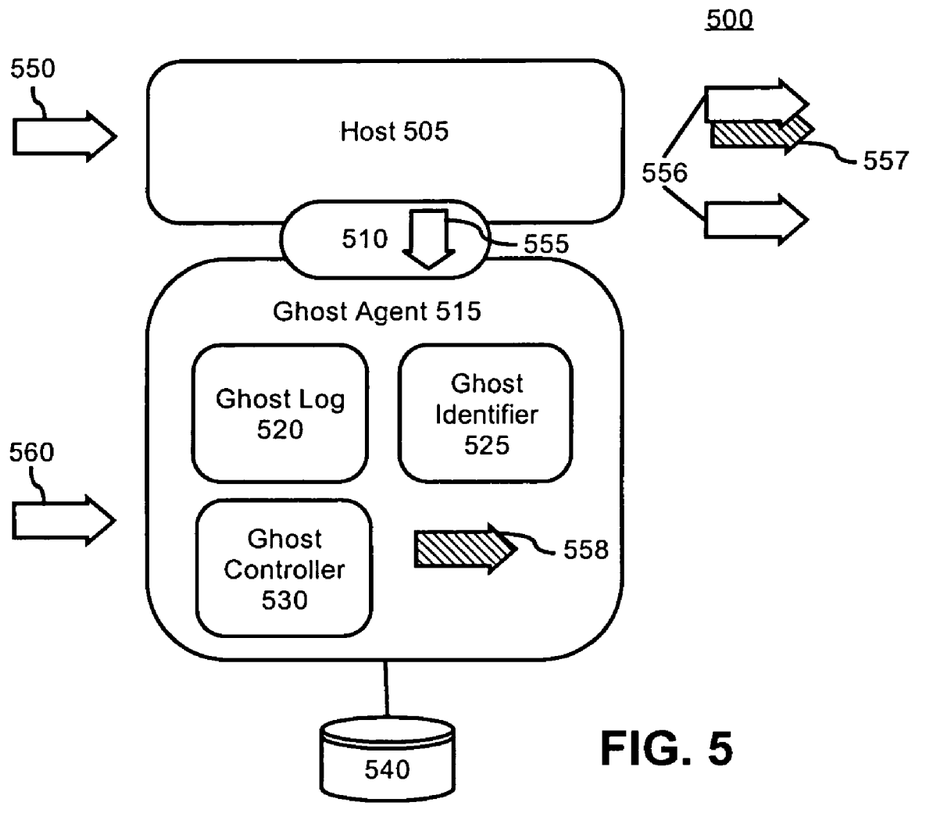
FIG. 5 is a schematic diagram illustrating a host and a ghost agent within a grid environment in accordance with the inventive arrangements described herein.

FIG. 5 is a schematic diagram illustrating a host 505 and a ghost agent 515 within a grid environment 500 in accordance with the inventive arrangements described herein. The host 505 can be any definable software unit within the grid environment 500 that can receive input 550 and execute actions 556. The input 550 can include messages of any type conveyed to the host 505, such as keyboard input, procedural calls, and the like. The actions 556 can be relatively high-level actions as well as low-level actions. High-level actions can include calls to software routines that can contain one or more external procedural calls. Low-level actions can include hardware device calls and the execution of one or more processes or threads.

The ghost agent 515 can be associated or bound to the host 505 though the ghost interface 510. The ghost interface can generate replicated actions 555 that are copies of the actions executed by the host 505, using any of a variety of suitable techniques. For example, techniques used by software debugging programs to attach monitors to running programs in order to evaluate system behavior and step through code can be used by the ghost interface 510. Alternatively, techniques used by system calibration and hardware performance testing utilities can be used by the ghost interface 510 to bind the ghost agent 515 with the host 505. Further, operating system level commands, tools, and functions analogous or similar to the UNIX commands "pstrace" and "ptrace," can potentially be used by the ghost interface 510 to bind the host 505 with the ghost agent 515.

More specifically, the ghost interface 510 of one embodiment can be implemented as one or more Java software objects. In such an embodiment, the ghost interface 510 can cause a Java web server to be initialized with the Java debugging command, "java_g." The ghost interface 510 can utilize a Java debugging object to replicate the actions of the host 505 and convey the replicated actions 555 to the ghost agent 515. Additionally, passwords provided by the host 505 can be echoed to the ghost interface 510 and used to authorize the ghost agent 515 as appropriate.

In another example within a Java environment, both the host 505 and the ghost agent 515 can be implemented as different Java classes and the ghost interface 510 can appropriately convey messages between the host 505 and ghost agent 515 classes. In yet another example the ghost interface 510 can be implemented using a Java/Tcl blend, where Tcl is a computing language that interoperates Java code segments. In that example, the ghost interface 510 can use the "java::bind" command to generate callback scripts from events in the host 505. The call back scripts can replicate actions for the ghost agent 515.

The implementations of the ghost interface 510 are not restricted to the Java programming language and one of ordinary skill in the art can utilize the conventions of any language to implement the invention described herein in any of a variety of manners. For example, the ghost interface 510 can be implemented using a GNU debugger distributed by the Free Software Foundation and an Apache server distributed by the Apache Software Foundation. The GNU debugger can be attached to an Apache server causing all activity occurring within the server to be directed to the gnu debugger. The host 505 can be disposed within the Apache server and the ghost agent 515 can utilize replicated actions of the host 505 provided by the gnu debugger.

Regardless of how the ghost interface 510 is implemented, the ghost agent 515 can analyze and/or modify the replicated actions 555 and record data relating to the replicated actions 555. A replicated action 555 can be utilized by the ghost agent 515 as a passive action 558 or an active action 557. The passive action is a "read only" action that has no operational effect upon the grid environment 500. That is, the passive action 558 can be stored and not rebroadcast or sent into the grid environment 500 to be executed. An active action 557, on the other hand, is executed within the grid environment 500. That is, the active action 557 can be sent to a recipient or destination within the grid environment 500 to be executed.

The ghost agent 515 can include a ghost log 520, a ghost identifier 525, and a ghost controller 530. The ghost log 520 can record the data relating to the replicated actions 555, thereby creating a log. The ghost log 520 can be configured to record all activities relating to the associated host 505 or can be configured to record only selected activities. For example, in one embodiment, the ghost log 520 can record only activities considered errors, thereby generating an error log. In another example, the ghost log 520 can record a statistically relevant portion of actions, such as recording data relating to every nth replicated action 555. The ghost log 520 can also capture system information and add annotations from this system information to the generated log.

For example, system clock information can be captured and used to annotate the time between receiving a replicated action 555 and the completion time for an associated active action 557. In another example, metadata information contained within message flows, such as input 550, action 556, and active action 557, can be recorded and/or utilized by the ghost log 520. Additionally, the ghost log 520 can time stamp data relating to replicated actions 555.

The ghost log 520 can also record the log information in a ghost log repository 540. The ghost log repository 540 can be a temporary buffer or a persistent data storage area. If the ghost log repository 540 is external to the ghost agent 515, any of a variety of different mechanisms can be utilized to convey the log data to the ghost log repository 540.

For example, an intermittent communication link, such as a unicast or a point-to-point communication link can be established between the ghost log 520 and the ghost log repository 540 through which data can be conveyed. In another example, a buffer space, which can be another embodiment of ghost log 520, within the ghost agent 515 can record log information. Whenever the buffer reaches a specified volume of data, a message containing the buffered information can be conveyed to the ghost log repository 540 and the buffer within the ghost agent 515 can be cleared and used to store fresh data.

In yet another example, ghost agents 515 can convey log data to a local data server. The local data server can then convey all received log data to the ghost log repository 540 from time to time or on a periodic basis. In still another example, the ghost agent 515 can intermittently deposit log data to a local location. Then a data-reaping object can gather packets of the log data that have been locally deposited by the various ghost agents 515. The packets of log data can be conveyed to the ghost log repository 540 by the data-reaping objects.

The ghost identifier 525 can provide identification, authorization, and security related functions for the ghost agent 515. That is, the ghost identifier 525 can identify the ghost agent 515 to the various components of the grid environment 500. Accordingly, servers in the grid environment 500 can have an awareness of the ghost agent 515. The grid servers can then use policy-based controls to manage permissions, authentication, resource utilization, and security for the ghost agents 515. Ghost agents 515 adhering to the established policies can be permitted to automatically enter and exit the various grids of the grid environment 500.

The ghost agent 515 can be granted different access privileges to computing resources as the ghost agent 515 traverses from one grid in a grid environment 500 to another depending on grid-based policies. Privileges afforded the ghost agent 515 can be determined any manner known in the art. For example, a ghost agent 515 can replicate the passwords provided by the host 505 and use the replicated passwords to provide authentication to the grid environment 500. In another example, before a ghost agent 515 can be permitted to follow an associated host 505 from one grid in the grid environment 500 to the next, a password or digital certificate unique to the ghost agent 515 can be required. The ghost agent 515 can receive the same system privilege level with the grid environment 500 as the host 505 or can receive a different privilege level.

The ghost controller 530 can manage the ghost agent 515. For example, the ghost controller 530 can establish a life span for a particular ghost agent 515 so that the ghost agent 515 self-terminates after a designated period. In another example, the ghost controller 530 can restrict the computing resources consumed by the ghost agent 515, thereby freeing up system resources in the grid environment 500 for improved operational performance. Alternately, the ghost controller 530 can increase the computing resources consumed by the ghost agent 515, thereby slowing down operational performance in the grid environment 500. Slowing performance can be beneficial when simulating a load during testing.

In one embodiment, the ghost controller 530 can accept control signals 560 from an external source. For example, the ghost controller 530 can receive debugging commands that trigger debugging functions to be performed. Further, the ghost controller 530 can include a listener object capable of responding to particular events broadcasted by a corresponding notifier object. For example, a server could broadcast a signal causing all ghost controllers 530 to limit the resource consumption of all ghost agents 515 presently disposed in the server. Similarly, a grid wide broadcast could cause specified ghost agents 515 to self-terminate.

While ghost log repository 540 is depicted as being external and possibly remotely located from the ghost agent 515, it should be appreciated that the ghost log repository 540 can also be an allocated memory space internal to the ghost agent 515. For example, the ghost log repository 540 can be a dynamically allocated segment of random access memory (RAM) available to the ghost agent 515 as needed.

Figure 6:
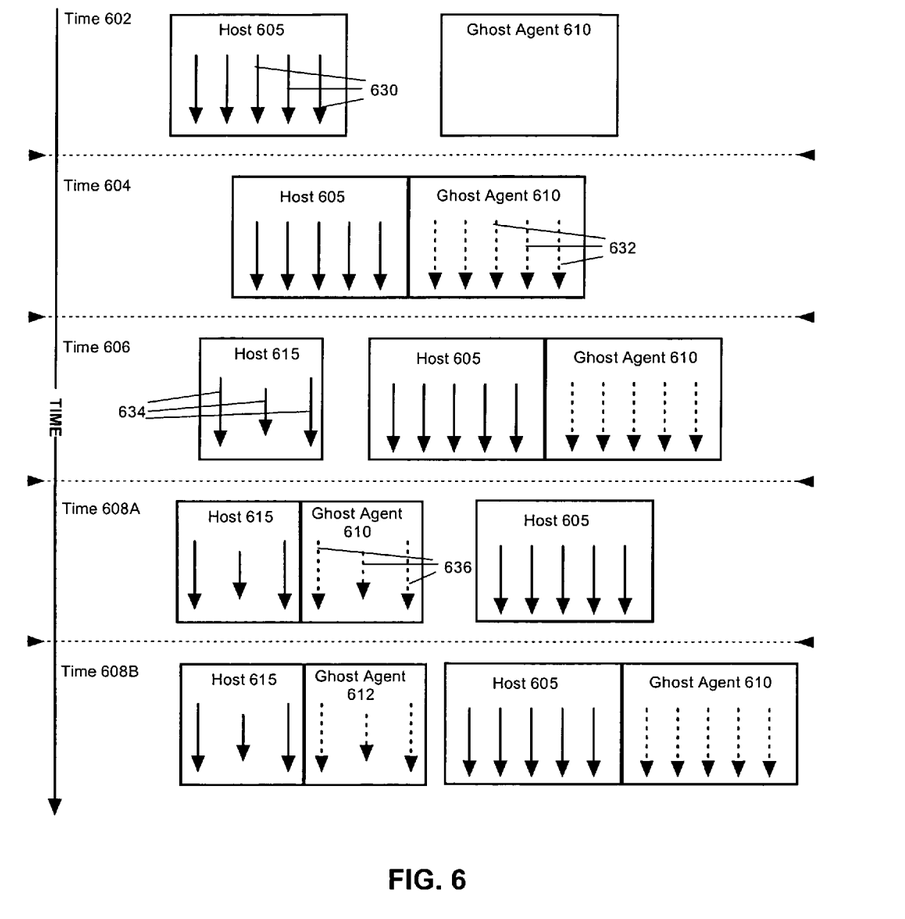
FIG. 6 is a schematic diagram illustrating the interaction between hosts and ghost agents over time in accordance with the inventive arrangements disclosed herein.

FIG. 6 is a schematic diagram illustrating the interaction between hosts and ghost agents over time in accordance with the inventive arrangements disclosed herein. The interaction can begin at time 602 with an unassociated ghost agent 610 and a host 605 executing host actions 630. At time 604, the ghost agent 610 can associate itself with the host 605. During this association process, each host action 630 within the host 605 can be replicated within the ghost agent 610 as a ghost action 632. Further, anytime a new action is initiated within the host 605, the new action can be replicated within the associated ghost agent 610.

Each ghost action 632 can be either a passive or an active action. For example, the host actions 630 can be executed within the grid environment while the ghost actions 632 can be passive actions that are operationally disabled. Passive actions are those actions that do not affect the operational behavior of the host 605.

In another arrangement, the ghost actions 632 can be active actions affecting the operational performance of the environment and/or the associated host 605. For instance, a ghost action 632 can consume limited computing resources thereby inducing a delay into the system and potentially slowing down system response time for the corresponding host 605. Delays induced by ghost actions 632 can be tailored by changing the execution details of the instruction set described within individual ghost actions 632.

For example, if a host action 630 invokes a portion of code such as an interactive process that cycles fifty times, the originally copied ghost action 632 can also cycle fifty times. The ghost agent 610 can increase the number of cycles in the iterative process to some number greater than fifty to slow down processing time and can decrease the cycles to a number less than fifty to speed up processing time.

At time 606, an interaction between host 605 and host 615 executing actions 634 can occur. This interaction can trigger either a transfer of the ghost agent 610 or a cloning of the ghost agent 610, wherein time 608A illustrates the results of an exemplary transfer action and time 608B illustrates the results of an exemplary cloning action.

At time 608A, the ghost agent 610 can be transferred from host 605 to host 615. For example, the ghost agent 610 can be first disassociated with host 605. The disassociation causes the ghost agent 610 to stop replicating actions of the host 605. Then the ghost agent 610 can be associated with host 615. During the association, the actions 634 can be replicated within ghost agent 610 resulting in ghost actions 636. Accordingly, the actions now recorded by the ghost agent 610 and placed within a ghost log repository are based upon host 615 and are not based upon host 605. In another example, the ghost agent 610 can be replicated and attached to the host 615. Once replicated, the original ghost agent 610 associated with the host 605 can be deleted.

At time 608B, the ghost agent 610 can be cloned resulting in the creation of ghost agent 612, which is a copy of ghost agent 610. Ghost agent 612 is then associated with host 615. During the association, the actions 634 can be replicated 636 within ghost agent 612. Accordingly, the actions for both host 605 and host 615 can be recorded by respective ghost agents 610 and 612 and thereafter placed in the ghost log repository for logging purposes.

It should be noted that ghost agents 610 and 612 can be self-managing, self-identifying software objects capable of performing predefined tasks in a self-sufficient manner. For example, the ghost agents 610 and 612 can be programmed to seek a host of a specified type, to track a desired host from one grid location to another within a grid environment, to move from one grid in a grid environment to another, and/or to associate with hosts. In another example, the ghost agents 610 and 612 can be programmed to clone and attach themselves whenever a predetermined condition occurs, such as whenever a user object of a particular type is encountered.

The ghost agents 610 and 612 can also exchange information between themselves. For example, ghost agent 610 and ghost agent 612 can convey messages, records, and individual replicated actions to each other. Notably if ghost agent 610 and ghost agent 612 are disposed in different grids and if each was to move to the other's grid, the swapping of information between the two ghost agents 610 and 612 can be performed in lieu of moving each ghost agent.

In particular embodiments, each grid in a grid environment can contain a number of "blank" ghosts. "Movement" of a ghost from a first grid to a second grid can actually be performed by transferring the information from the "moving" ghost in the first grid to the "blank" ghost in the second grid. The "moving" ghost, now emptied of content, can be treated as a "blank" ghost for the first grid.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for debugging software objects within a grid environment comprising the steps of:
   identifying a host, wherein said host is a software object operating in a grid of said grid environment;
   associating a ghost agent within said grid with said host, wherein said ghost agent is configured to replicate and record at least one action of said host within said grid;
   debugging said host based upon said recorded actions;
   moving said host from said grid to another grid within said grid environment; and,
   in response to said moving of said host, moving said ghost agent from said grid to said another grid.

2. The method of claim 1, wherein said actions executed by said host are executed within a production environment, said method further comprising the step of preventing said replicated actions from operationally executing in said production environment.

3. The method of claim 1, wherein said debugging step further comprises the steps of:
   receiving a debugging command;
   executing said debugging command; and
   responsively generating at least one debugging message.

4. The method of claim 3, further comprising the steps of:
   determining a location that is external to said ghost agent; and,
   conveying said debugging messages to said determined location.

5. The method of claim 1, said debugging step further comprising the steps of:
   identifying a parameter defined within said host; and,
   determining a value for said parameter using said ghost agent.

6. The method of claim 5, said debugging step further comprising the steps of:
   determining said value for said parameter before one of said replicated actions is executed; and,
   determining a value for said parameter after said replicated action is executed.

7. The method of claim 1, said debugging step further comprising the steps of:
   determining a processing break point for at least one of said replicated actions; and,
   halting execution of said replicated action at said processing break point.

8. The method of claim 7, said debugging step further comprising the step of determining at least one parameter value occurring at said processing break point.

9. The method of claim 1, said debugging step further comprising the steps of:
   stepping the execution of at least a portion of said replicated actions; and,
   for each execution step, determining at least one parameter value.

10. The method of claim 1, further comprising the steps of:
    selecting a plurality of hosts; and,
    for each selected host, repeating said associating step, said debugging step, and said moving step.

11. The method of claim 10, wherein said selected hosts are utilized within an application domain, said method further comprising the step of debugging said application domain.

12. The method of claim 11, wherein said selected hosts are disposed within different grids of said grid environment, said method further comprising the step of:
    providing an interface for debugging said application domain, wherein said interface is configured to debug said selected hosts regardless of which grid said selected hosts are disposed within.

13. A computer-readable storage medium, comprising computer instructions for a debugger to debug software within a grid computing environment, said debugger comprising a debugger interface for debugging software objects for an application domain distributed within different grids of a grid environment,
    wherein said software objects comprise a plurality of hosts and at least one ghost agent configured to be associated with a selected one of said hosts to replicate and record at least one action of said hosts,
    wherein at least a portion of said hosts move from one grid within said grid environment to another grid, and wherein said ghost agents responsively move from said one grid to said another grid in response to movement of said associated host,
    wherein said ghost agent is further configured to debug said associated host, and
    wherein said interface conveys debugging commands to said ghost agents and responsively receives debugging messages.

14. The computer-readable storage medium of claim 13, said debugger further comprising:
    a debugging data store configured to record said debugging messages from a plurality of said ghost agents.

15. The computer-readable storage medium of claim 14, said debugger further comprising:
    a debugging analyzer configured to analyze data within said debugging data store.

16. A computer-readable storage medium in a grid computing environment, comprising computer instructions for a ghost agent associated with a host operating within said grid environment, said ghost agent comprising a ghost controller for:
    managing interactions between said ghost agent and said grid environment,
    accepting debugging commands from an external source,
    responsive to said debugging commands, performing debugging functions, and,
    recording debugging messages in a ghost log of said ghost agent,
    wherein said ghost agent automatically moves from one grid to another grid within said grid computing environment in response to said associated host moving from said one grid to said another grid, and
    wherein said ghost agent is configured to replicate and record at least on action of said associated host.

17. The computer-readable storage medium of claim 16, said ghost agent further comprising an interface for associating said ghost agent with said host.

18. The computer-readable storage medium of claim 16, said ghost agent further comprising a ghost identifier configured to identify said ghost agent to components within said grid environment.

19. The computer-readable storage medium of claim 16, further comprising computer instructions for:
- disassociating said ghost agent from said host; and,
- associating said ghost agent with a different host.

20. A computer-readable storage medium having stored thereon, a computer program having a plurality of code sections, said code sections executable by a machine for causing the machine to perform the steps of:
- identifying a host, wherein said host is a software object operating in a grid of a grid environment;
- associating a ghost agent within said grid with said host, wherein said ghost agent is configured to replicate and record at least one action of said host within said grid;
- debugging said host based upon said replicated actions;
- moving said host from one grid within said grid environment to another grid; and,
- in response to said moving of said host, moving said ghost agent from said one grid to to said another grid.

21. The computer-readable storage medium of claim 20, wherein said actions executed by said host are executed within a production environment, said method further comprising the step of preventing said replicated actions from operationally executing in said production environment.

22. The computer-readable storage medium of claim 20, wherein said debugging step further comprises the steps of:
- receiving a debugging command;
- executing said debugging command; and
- responsively generating at least one debugging message.

23. The computer-readable storage medium storage of claim 22, further comprising the steps of:
- determining a location that is external to said ghost agent; and,
- conveying said debugging messages to said determined location.

24. The computer-readable storage medium of claim 20, said debugging step further comprising the steps of:
- identifying a parameter defined within said host; and,
- determining a value for said parameter using said ghost agent.

25. The computer-readable storage medium of claim 24, said debugging step further comprising the steps of:
- determining said value for said parameter before one of said replicated actions is executed; and,
- determining a value for said parameter after said replicated action is executed.

26. The computer-readable storage medium of claim 20, said debugging step further comprising the steps of:
- determining a processing break point for at least one of said replicated actions; and,
- halting execution of said replicated action at said processing break point.

27. The computer-readable storage medium of claim 26, said debugging step further comprising the step of determining at least one parameter value occurring at said processing break point.

28. The computer-readable storage medium of claim 20, said debugging step further comprising the steps of:
- stepping the execution of at least a portion of said replicated actions; and,
- for each execution step, determining at least one parameter value.

29. The computer-readable storage medium of claim 20, further comprising the steps of:
- selecting a plurality of hosts; and,
- for each selected host, repeating said associating step, said debugging step, and said moving step.

30. The computer-readable storage medium of claim 29 wherein said selected hosts are utilized within a common application domain, said method further comprising the step of debugging said application domain.

31. The computer-readable storage medium of claim 30, wherein said selected hosts are disposed within different grids of said grid environment, said method further comprising the step of:
- providing an interface for debugging said application domain, wherein said interface is configured to debug said selected hosts regardless of which grid said selected hosts are disposed within.

32. A system for debugging software objects within a grid environment comprising the steps of:
- means for identifying a host, wherein said host is a software object;
- means for associating a ghost agent with said host;
- means for replicating and recording actions executed by said host for use by said ghost agent;
- means for debugging said host based upon said replicated actions; and,
- means for moving said ghost agent from one grid to within said grid environment to another grid in response to moving said host from said one grid to said another grid.

* * * * *